(12) United States Patent
Sakashita

(10) Patent No.: US 7,474,361 B2
(45) Date of Patent: Jan. 6, 2009

(54) DISPLAY APPARATUS AND DISPLAY METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 11/220,540

(22) Filed: Sep. 8, 2005

(65) Prior Publication Data

US 2006/0055830 A1 Mar. 16, 2006

(30) Foreign Application Priority Data

Sep. 14, 2004 (JP) ............................. 2004-266725
Jul. 12, 2005 (JP) ............................. 2005-202694

(51) Int. Cl.
*H04N 3/22* (2006.01)
*H04N 3/26* (2006.01)

(52) U.S. Cl. ...................................... 348/745; 348/750

(58) Field of Classification Search ......... 348/745–747, 348/750, 751, 806, 807, 808, 658, 655, 687, 348/645, 383

See application file for complete search history.

(56) References Cited

U.S. PATENT DOCUMENTS

| 5,583,578 | A | * | 12/1996 | Tateishi | .................... 348/615 |
| 2004/0012616 | A1 | * | 1/2004 | Yokoyama et al. | .......... 345/690 |
| 2006/0038825 | A1 | | 2/2006 | Sakashita | .................... 345/592 |

FOREIGN PATENT DOCUMENTS

| CN | 1127263 C | 11/2003 |
| JP | HEI 09-200571 | 7/1997 |
| JP | HEI 10-84551 | 3/1998 |
| JP | 2000-122598 | 4/2000 |

* cited by examiner

*Primary Examiner*—M. Lee
(74) *Attorney, Agent, or Firm*—Fitzpatrick, Cella, Harper & Scinto

(57) ABSTRACT

A display apparatus includes a plurality of optical modulators that display monochromatic images, respectively, an optical system that synthesizes the monochromatic images into a color image, a luminance non-uniformity correction unit that adjusts a correction coefficient according to a luminance to be displayed, and that corrects a luminance non-uniformity in the monochromatic image using the adjusted correction coefficient, and a color non-uniformity correction unit that adjusts a luminance balance among the monochromatic images per pixel or pixel block, thereby correcting a color non-uniformity in the color image.

7 Claims, 9 Drawing Sheets

FIG. 5

| | | INPUT SIGNAL | DISPLAY LUMINANCE |
|---|---|---|---|
| (A) | BEFORE CORRECTION | LEVEL (LEVEL:HIGH) — constant | LUMINANCE, MAX — curve peaking then decreasing |
| (B) | LUMINANCE NON-UNIFORMITY CORRECTION ↓ | LUMINANCE NON-UNIFORMITY CORRECTION COEFFICIENT (CORRECTION AMOUNT: SMALL) % — constant | |
| (C) | AFTER LUMINANCE CORRECTION | LEVEL — constant | CORRECTION EFFECT: SMALL LUMINANCE, MAX — curve peaking then decreasing |
| (D) | COLOR NON-UNIFORMITY CORRECTION ↓ | COLOR NON-UNIFORMITY CORRECTION COEFFICIENT VALUE — stepped around 0, PIXEL OR PIXEL BLOCK | |
| (E) | AFTER LUMINANCE AND COLOR CORRECTION | LEVEL — stepped | LUMINANCE, MAX — stepped curve |

DISPLAY APPARATUS AND DISPLAY METHOD

BACKGROUND OF THE INVENTION

1. Field of the Invention

The present invention relates to a display apparatus and a display method thereof. More specifically, the present invention relates to a method for improving color non-uniformity and luminance non-uniformity.

2. Description of the Related Art

As methods for correcting color non-uniformity of a display apparatus, there is known a method, as disclosed in, for example, Japanese Patent Application Laid-Open (JP-A) No. HEI10-84551 (Japanese Patent No. 3202613), for correcting the color non-uniformity by dividing a display screen into blocks, making the divided blocks uniform in luminance level, and thereby correcting the color non-uniformity that occurs to the display screen.

There is also known a method, as disclosed in JP-A No. HEI9-200571, for increasing a correction amount large at a low luminance compared to at a high luminance at which the input video signal level is high, using a gain adjustment circuit and a DC offset adjustment circuit.

The method disclosed in JP-A No. HEI10-84551 has, however, the following disadvantage. The luminance of the entire display screen is made uniform by reducing the luminance of the high luminance part according to the low luminance part. As a result, a maximum luminance of the display screen is reduced.

JP-A No. HEI9-200571 discloses that the luminance non-uniformity and the color non-uniformity are corrected by making the luminance uniform as done by so-called shading correction, and that it suffices that the correction amount at the high luminance is small since the luminance non-uniformity and the color non-uniformity are less conspicuous at the high luminance.

However, at the high luminance, it is true that the luminance non-uniformity is less conspicuous but the color non-uniformity is still conspicuous. Due to this, if the correction amount is simply set small at the high luminance as disclosed in JP-A No. HEI9-200571, it is impossible to improve image quality degradation resulting from the color non-uniformity.

On the other hand, demand for increasing the luminance of the display screen of a display apparatus, particularly a projection display apparatus (projector) rises so as to improve visibility at a bright location. Demand for reducing the color non-uniformity and the luminance non-uniformity also rises following an increase in a size of the display screen. As stated above, it is conventionally difficult to realize both an increase in the luminance of the display screen and a reduction in the color non-uniformity and the luminance non-uniformity.

SUMMARY OF THE INVENTION

It is an object of the present invention to provide a display apparatus and a display method capable of correcting color non-uniformity without reducing a maximum luminance of a display screen.

It is also an object of the present invention to provide a display apparatus and a display method capable of correcting both luminance non-uniformity and color non-uniformity if an image is displayed at a low luminance with conspicuous luminance non-uniformity.

To attain these objects, the present invention adopts the following constitutions.

According to a first aspect of the present invention, there is provided a display apparatus comprising, a plurality of optical modulators that display monochromatic images, respectively, an optical system that synthesizes the monochromatic images into a color image, a luminance non-uniformity correction unit that adjusts a correction coefficient according to a luminance to be displayed, and that corrects a luminance non-uniformity in the monochromatic image using the adjusted correction coefficient, and a color non-uniformity correction unit that adjusts a luminance balance among the monochromatic images per pixel or pixel block, thereby correcting a color non-uniformity in the color image.

According to a second aspect of the present invention, there is provided a display method for displaying a color image by synthesizing a plurality of monochromatic images, comprising the steps of: adjusting a correction coefficient in accordance with a luminance to be displayed; correcting a luminance non-uniformity in the monochromatic images using the adjusted correction coefficient; and correcting a color non-uniformity in the color image by adjusting a luminance balance among the monochromatic images per pixel or pixel block.

According to the present invention, it is possible to appropriately correct the luminance non-uniformity and the color non-uniformity of a displayed image and realize high level image display without causing a reduction in display luminance.

BRIEF DESCRIPTION OF THE DRAWINGS

FIG. 5 is an explanatory view for a method for correcting color non-uniformity and luminance non-uniformity according to the embodiment of the present invention if an input level is high;

DESCRIPTION OF THE PREFERRED EMBODIMENT

Most preferred embodiment of the present invention will be described hereinafter in detail with reference to the drawings. It should be noted, however, that sizes, materials, shapes, functions, relative positions, etc. of constituent elements described in the embodiment are not intended to limit the scope of the present invention unless specified otherwise.

Figure 1:
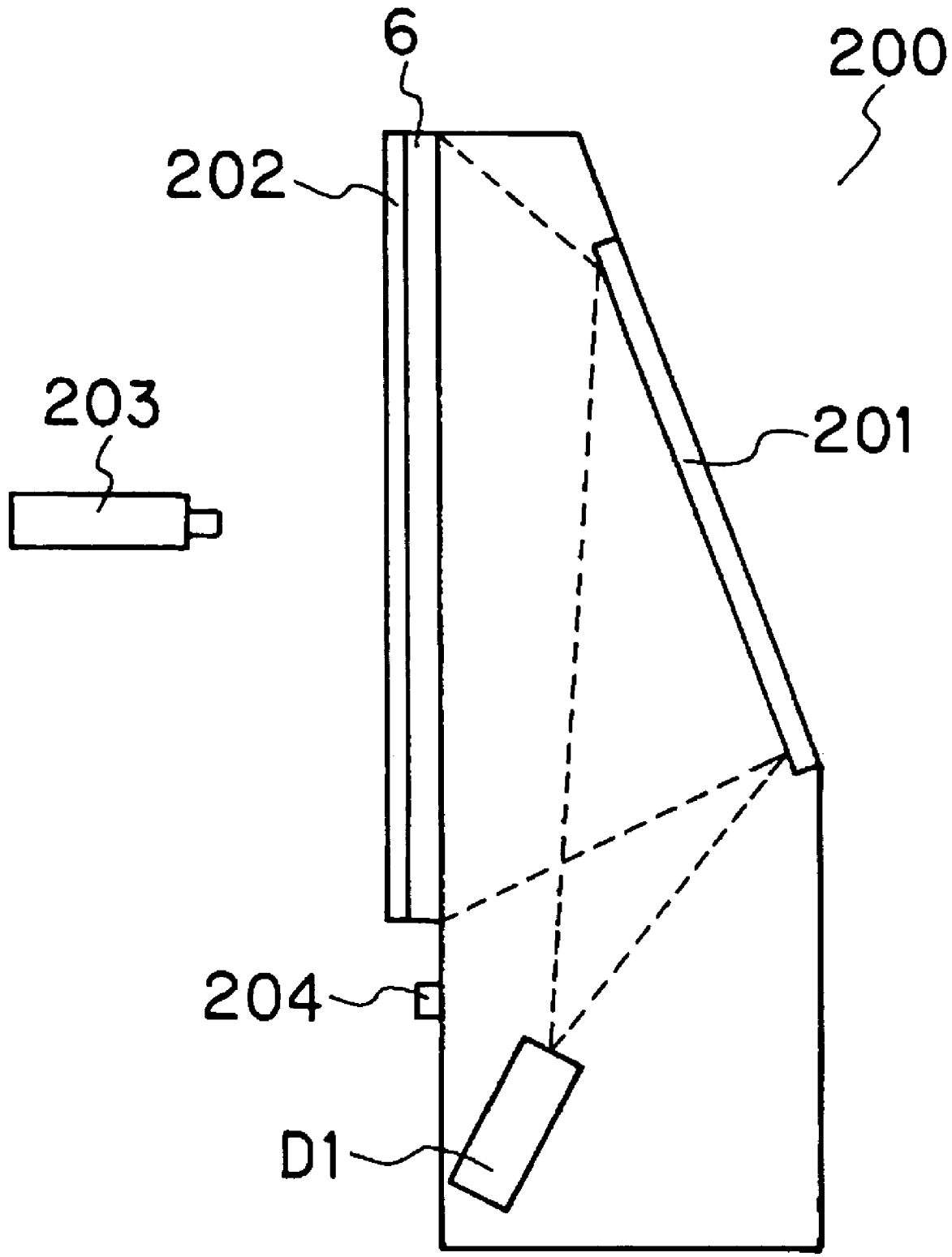
FIG. 1 is a side sectional view of a rear projection display apparatus according to an embodiment of the present invention.

FIG. 1 is a side sectional view of a rear projection display apparatus 200 according to an embodiment of the present invention. Referring to FIG. 1, an image projected from a projection display engine D1 is reflected by a reflection mirror 201 and projected on a rear surface of a screen 6. A digitizer 202 is attached to a front surface of the screen 6. The digitizer 202 inputs position coordinates input from the front surface of the screen 6 using a digitizer pen 203 to the display apparatus 200. As the digitizer 202, any one of an optical digitizer, a pressure-sensitive digitizer, an ultrasonic digitizer and the like can be used. A brightness adjustment switch (SW) 204 is a switch for indicating a brightness of the screen 6.

Figure 2:
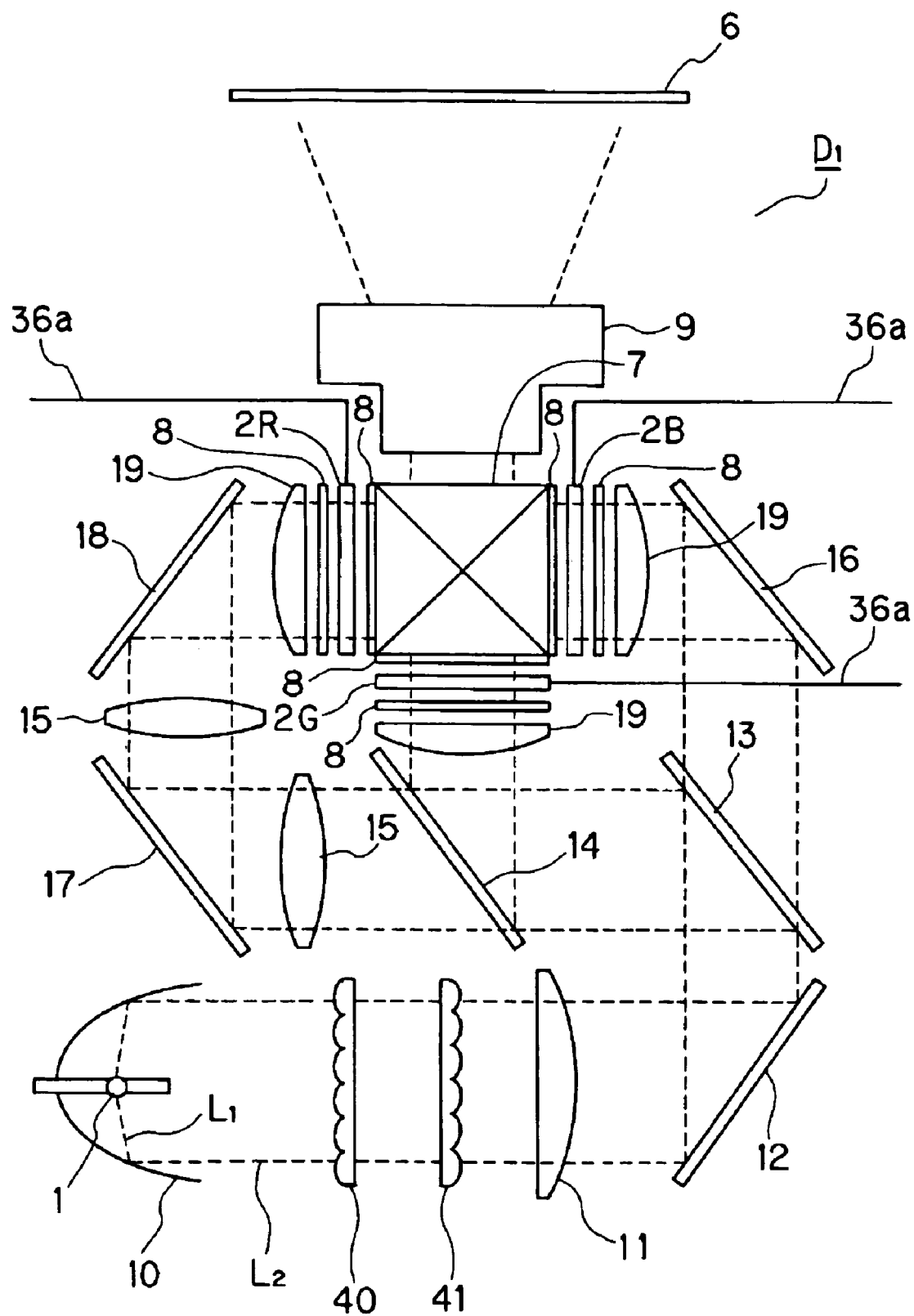
FIG. 2 depicts a projection display engine according to the embodiment of the present invention.

FIG. 2 depicts the projection display engine D1. The projection display engine D1 shown in FIG. 2 has three liquid crystal panels 2R, 2G, and 2B for displaying R, G, and B colors as optical modulators, respectively. The three liquid crystal panels 2R, 2G, and 2B are arranged at positions facing a cross prism 7. The cross prism 7 is an optical system that synthesizes monochromatic (R, G, and B) images displayed on the respective liquid crystal panels 2R, 2G, and 2B and that forms a full-color image. In this embodiment, twisted nematic (TN) liquid crystal panels driven using a thin film transistor (TFT) are employed as the respective liquid crystal panels 2R, 2G, and 2B. Two polarizing plates 8 are arranged on both sides of each of the liquid crystal panels 2R, 2G, and 2B to put the liquid crystal panels 2R, 2G, and 2B therebetween. A projection lens 9 and the screen (projection target member) 6 are arranged on a light emission side of the cross prism 7.

A parabolic reflector 10 is arranged so as to surround a lamp (light source) 1. This reflector 10 converts an emitted light from the lamp 1 into a parallel luminous flux. This reflector 10 may be other than the parabolic type. For example, an elliptic reflector may be employed to convert the emission light into a collected luminous flux. As the lamp 1, a metal halide lamp, a xenon lamp or the like can be employed.

Fly-eye integrators 40 and 41 are arranged on an optical path of the emitted light from the lamp 1 so as to hold a conjugate relationship with the liquid crystal panels 2R, 2G, and 2B. The integrators 40 and 41 correct non-uniformity of the light source.

On a light emission side of the fly-eye integrators 40 and 41, a relay lens 11 and a mirror 12 are arranged in this order. Two dichroic mirrors 13 and 14, a relay lens 15, and mirrors 16, 17, and 18 are also arranged. These optical systems branch the emitted light from the lamp 1 into three lights which are guided to the respective liquid crystal panels 2R, 2G, and 2B. Reference numeral 19 denotes a field lens.

If V-T curves of the liquid crystal panels 2R, 2G, and 2B are not uniform in plane, if the light irradiated from the lamp 1 is not uniform on the liquid crystal panels 2R, 2G, and 2B, or if the projected light is not uniform due to characteristics of the projection optical systems, image degradation such as color non-uniformity and luminance non-uniformity of a displayed image occurs as will be described later.

Figure 3:
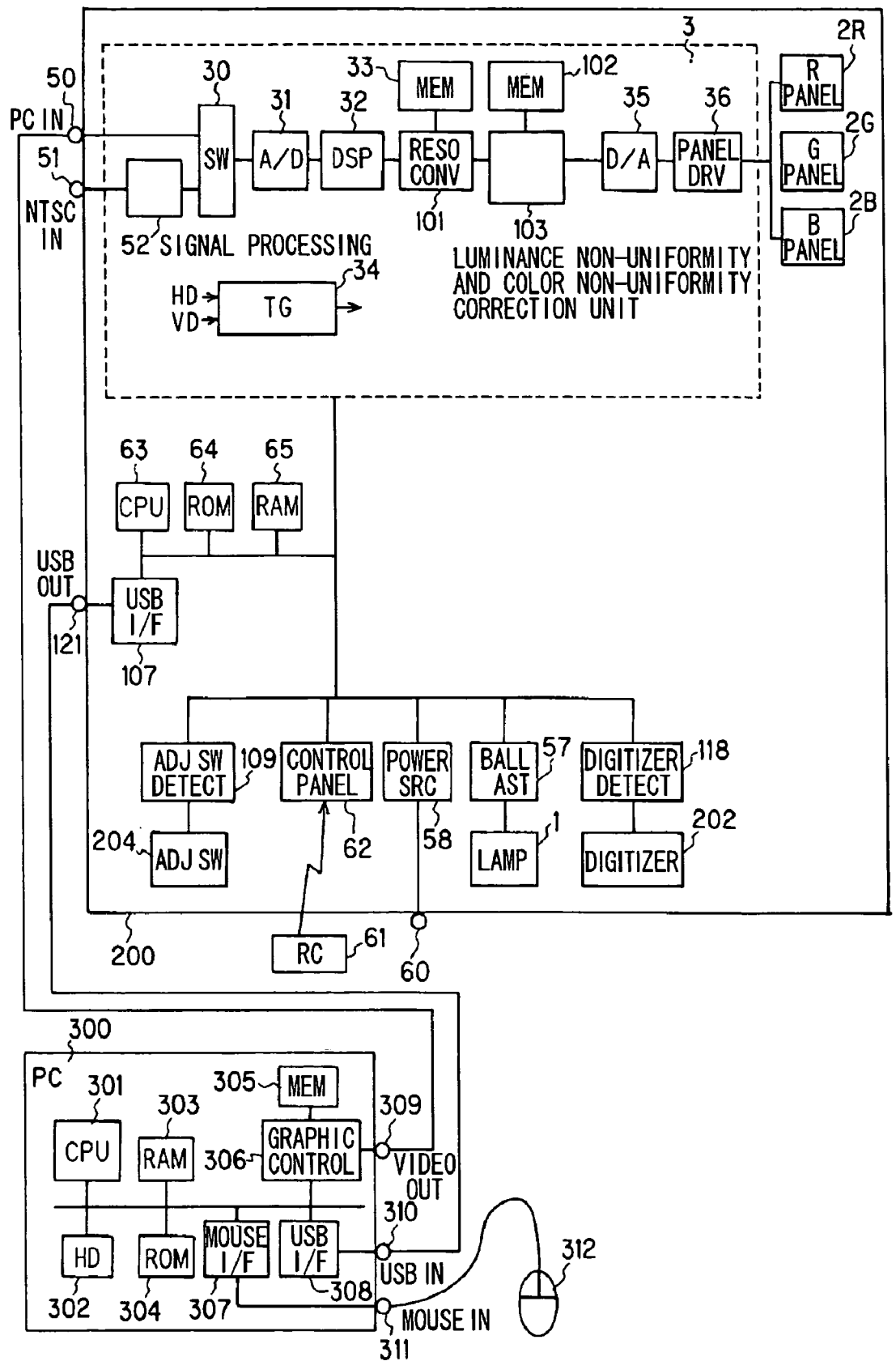
FIG. 3 is a block diagram of the rear projection display apparatus according to the embodiment of the present invention.

As shown in FIG. 3, a video signal processing unit 3 or the like is connected to the liquid crystal panels 2R, 2G, and 2B.

FIG. 3 is a block diagram of the rear projection display apparatus 200 according to this embodiment. Referring to FIG. 3, the rear projection display apparatus 200 includes the video signal processing unit 3. The video signal processing unit 3 includes a signal processing circuit 52, a switch 30, an A/D converter 31, a digital signal processor (DSP) 32, a memory 33 that holds present display data, data to be displayed in the next frame, and the like, a timing generator circuit 34, a resolution conversion unit 101, a memory 102 that stores display data used to correct luminance non-uniformity and color non-uniformity, a luminance non-uniformity and color non-uniformity correction unit 103, a D/A converter 35, and a driver circuit (panel driver) 36 that supplies a signal and a power applied to the respective liquid crystal panels 2R, 2G, and 2B. The DSP 32 performs displayed image processings such as contrast and brightness adjustment and color conversion.

Reference numeral 50 denotes a personal computer (PC) input terminal and reference numeral 51 denotes an NTSC (National Television System Committee) input terminal. In the block diagram of FIG. 3, only analog input signal terminals are shown. However, the input signal terminals are not limited to the analog input signal terminals. Needless to say, input terminals such as a low voltage differential signaling (LVDS) terminal and a transmission minimized differential signaling (TMDS) terminal, a digital TV D4 terminal, and the like can be effectively provided.

The signal processing circuit 52 performs signal processings such as decoding of an NTSC signal, noise reduction processing, band-limiting filtering, and signal level adjustment. Reference numeral 57 denotes a ballast serving as a lamp power source connected to the lamp 1. Reference numeral 58 denotes a system power source, and reference numeral 60 denotes an AC inlet. Reference numeral 61 denotes a remote controller that variously operates the display apparatus 200 according to this embodiment, and reference numeral 62 denotes a control panel that receives a signal from the remote controller 61.

Reference numeral 204 denotes the brightness adjustment SW, and reference numeral 109 denotes a brightness adjustment SW detection unit that detects an operation of the brightness adjustment SW 204. Reference numeral 118 denotes a digitizer detection unit that detects coordinates indicated by the digitizer 202. Reference numeral 107 denotes a USB interface (I/F).

Reference numeral 63 denotes a central processing unit (CPU), reference numeral 64 denotes a read only memory (ROM), and reference numeral 65 denotes a random access memory (RAM). This CPU 63 is connected to the video signal processing unit 3, the control panel 62, the ballast 57, the brightness adjustment SW detection unit 109, the digitizer detection unit 118, the USB I/F 107, and the like. The CPU 63 controls driving of the liquid crystal panels 2R, 2G, and 2B, the lamp 1, and the like, and enlarges, reduces, and moves a displayed image.

In this embodiment, it is described that the brightness adjustment SW detection unit 109, the digitizer detection unit 118, the USB I/F 107, and the like are connected to the CPU 63. Alternatively, they may be included in the CPU or configured to be executed by a program.

Reference numeral 300 denotes a personal computer (PC). The PC 300 includes a CPU 301, a hard disk (HD) 302, a RAM 303, a ROM 304, a video memory 305, a graphic controller 306, a mouse I/F 307, a USB I/F 308, and the like as well as a video output terminal 309, a USB input terminal 310, and a mouse input terminal 311. Reference numeral 312 denotes a mouse connected to the mouse input terminal 311.

(Conventional Luminance Non-Uniformity Correction Method)

Figure 4:
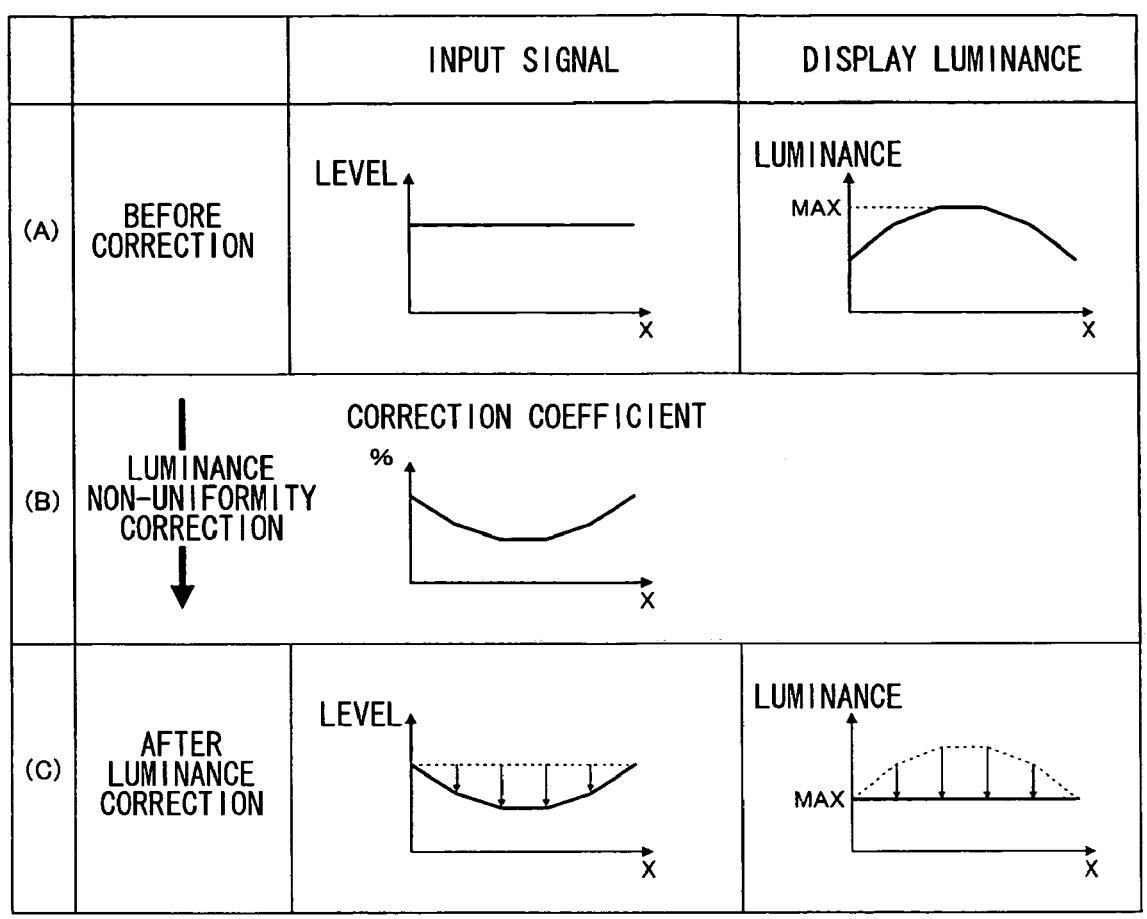
FIG. 4 is an explanatory view for a conventional luminance non-uniformity correction method.

FIG. 4 depicts a conventional luminance non-uniformity correction method.

FIG. 4(A) depicts an example of an input signal and a display luminance of the input signal before correcting the luminance non-uniformity. A vertical axis of the input signal indicates a level and a horizontal axis thereof indicates a pixel position in a horizontal direction. A vertical axis of the display luminance indicates a luminance and a horizontal axis thereof indicates a pixel position in the horizontal direction. If equal level signals are input to all pixels, then a central portion of the display screen has a higher luminance and both ends thereof have a lower luminance before correcting the luminance non-uniformity. If the luminance non-uniformity is large, an image quality of the displayed image is degraded.

FIG. 4(B) depicts a conventional correction coefficient (correction signal) for correcting the luminance non-uniformity shown in FIG. 4(A). This correction coefficient becomes maximum (e.g., 100%) on the both ends of the display screen having the lowest luminance and lower as the luminance is higher (closer to the center of the display screen). If this correction signal is multiplied by the signal before correction, then the signal level of low luminance parts (both ends of the screen) remains unchanged but that of a high luminance part (central portion of the screen) is reduced to be almost equal to that of the low luminance parts.

FIG. 4(C) depicts an example of the input signal and the display luminance of the input signal after correcting the luminance non-uniformity. Since the signal level of the central portion of the screen is reduced, the display luminance of the central portion of the screen is substantially equal to that of the both ends of the screen. As a result, a uniform luminance of the entire screen can be obtained.

However, such a conventional method has a disadvantage in that the luminance of the entire screen (maximum luminance MAX) is low since the luminance non-uniformity correction is performed so as to reduce the luminance of the high luminance parts according to the low luminance part.

(Luminance Non-Uniformity Correction Method According to this Embodiment)

Figure 6:
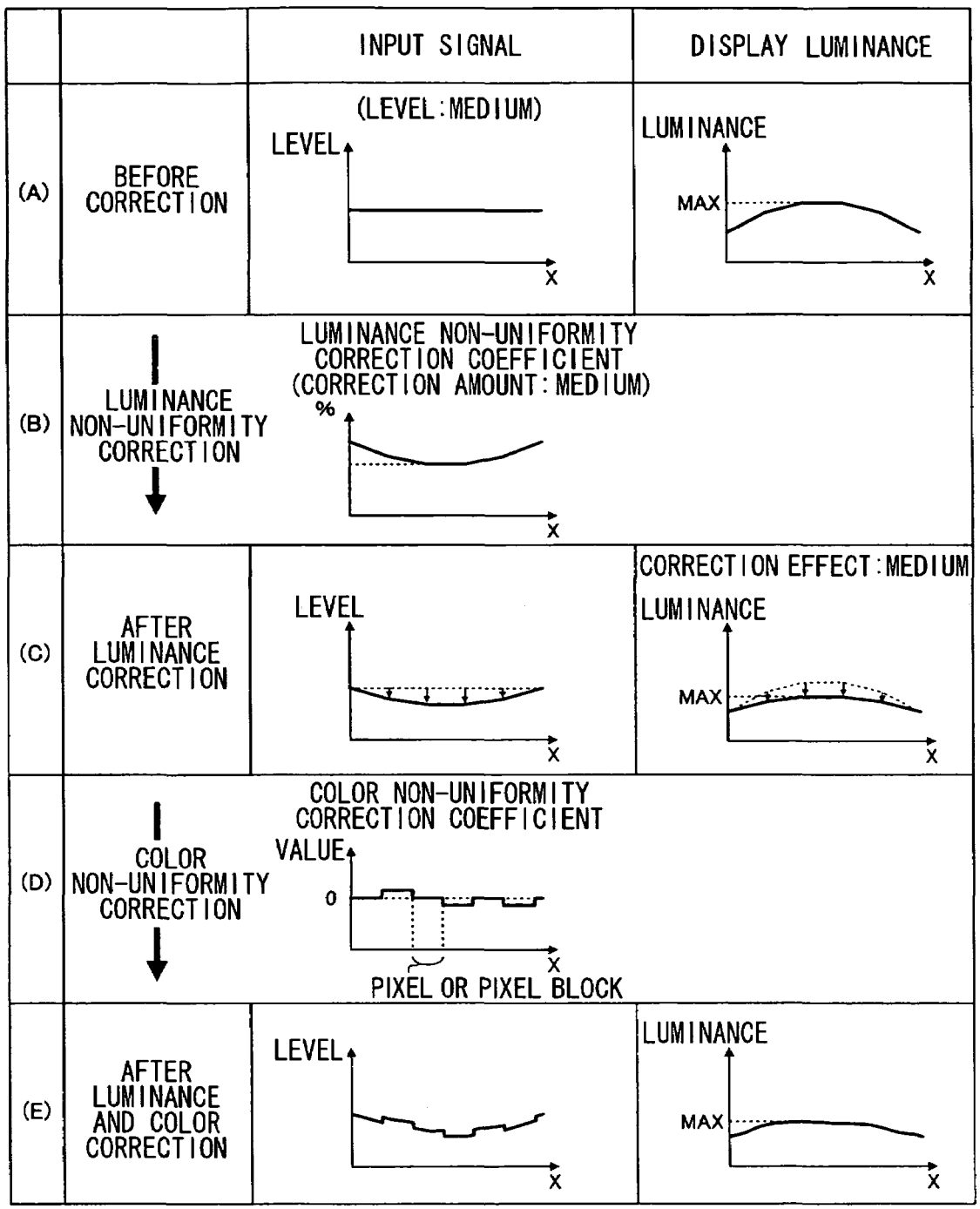
FIG. 6 is an explanatory view for a method for correcting color non-uniformity and luminance non-uniformity according to the embodiment of the present invention if the input level is intermediate.
Figure 7:
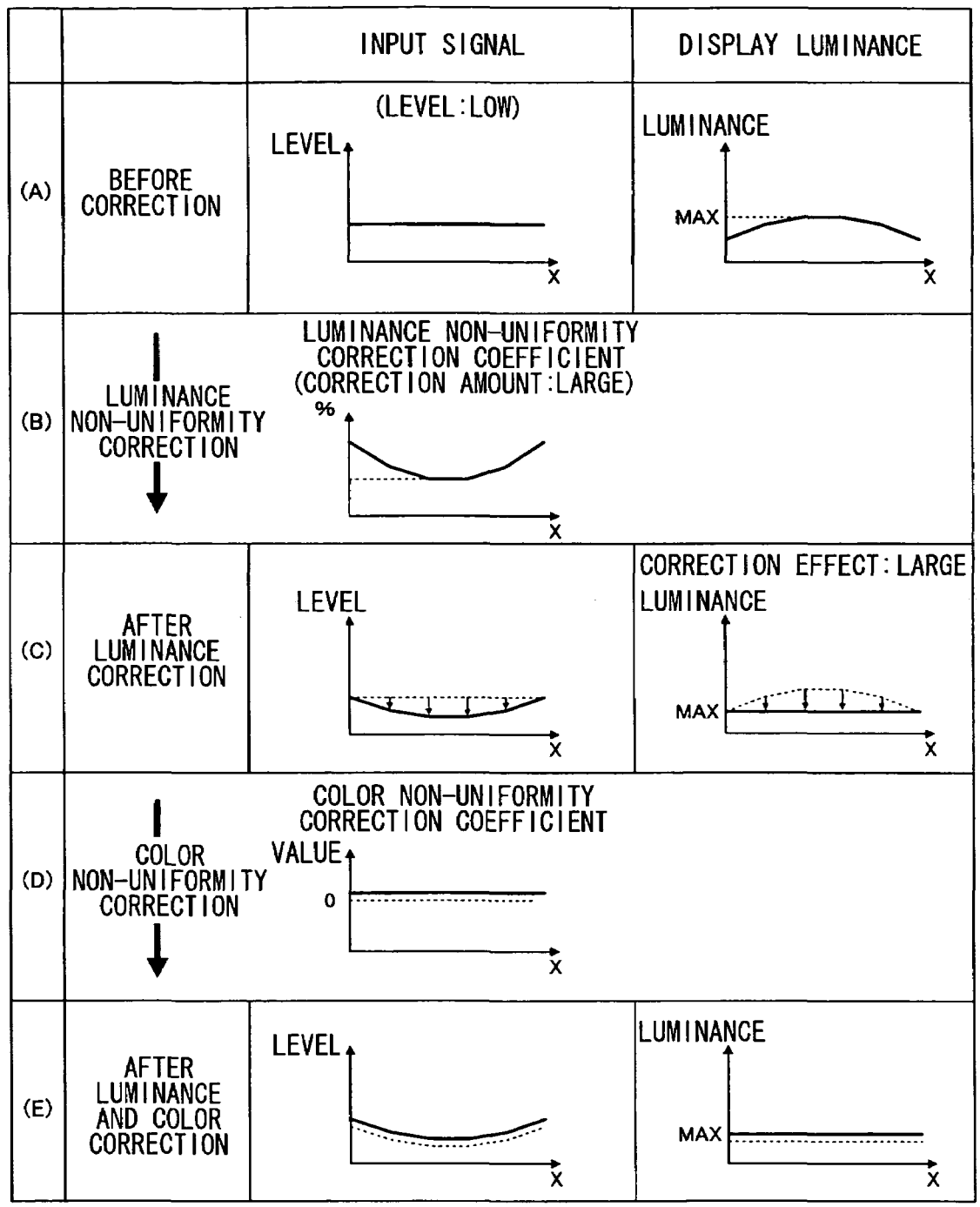
FIG. 7 is an explanatory view for a method for correcting color non-uniformity and luminance non-uniformity according to the embodiment of the present invention if the input level is low.

FIGS. 5, 6 and 7 depict examples of a luminance non-uniformity correction and a color non-uniformity correction according to this embodiment. In this embodiment, the effect of the luminance non-uniformity correction is changed in accordance with a level of a signal input to a luminance non-uniformity correction circuit. FIG. 5 depicts an example in which the input signal level (luminance level) is high. FIG. 6 depicts an example in which the input signal level (luminance level) is intermediate. FIG. 7 depicts an example in which the input signal level (luminance level) is low.

As shown in FIG. 5(A), if a high luminance level signal is input, a luminance non-uniformity correction coefficient having a small correction amount is selected as shown in FIG. 5(B). It is noted that there is no difference in correction amount due to display positions. In this example, the correction coefficient having zero correction amount is used. As shown in FIG. 5(C), the signal is output without the luminance non-uniformity correction. Therefore, the maximum luminance MAX is not reduced. In this case, a next processing is performed by a color non-uniformity correction unit, so that the image is displayed with a smaller chromaticity difference.

FIG. 7 depicts the example in which a low luminance level signal is input. In this case, a correction coefficient having a large correction amount is selected. Similarly to the conventional art in FIG. 4, the luminance non-uniformity correction is sufficiently performed so as to make the luminance of the entire screen uniform.

FIG. 6 depicts the example when an intermediate luminance level signal is input. The effect of the luminance non-uniformity correction is set to an intermediate effect between the effect shown in FIG. 5 and that shown in FIG. 7 according to the level of the input signal.

The luminance non-uniformity correction coefficient is calculated by multiplying an original correction coefficient output from a memory that stores the correction coefficient according to each pixel position information by an adjustment value set according to the luminance level.

(Configuration of Luminance Non-Uniformity and Color Non-Uniformity Correction Unit)

Figure 8:
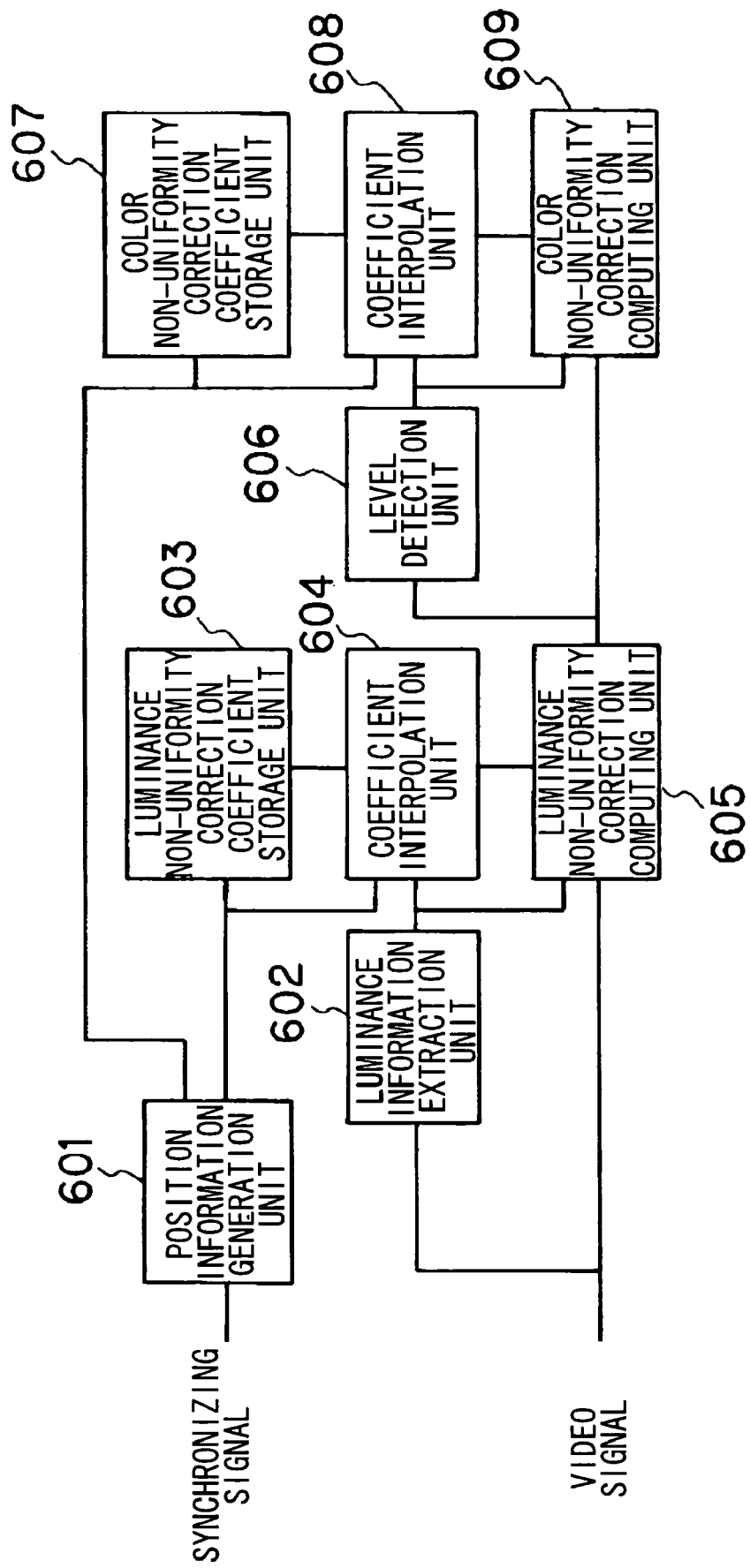
FIG. 8 is a block diagram of a circuit for correcting the luminance non-uniformity and the color non-uniformity according to the embodiment of the present invention.

FIG. 8 is a block diagram of the luminance non-uniformity and color non-uniformity correction unit according to this embodiment.

A position information generation unit 601 counts pixels of a video signal to be displayed in horizontal and vertical directions based on a horizontal synchronizing signal HSYNC and a vertical synchronizing signal VSYNC, and supplies a memory address to a luminance non-uniformity correction coefficient storage unit 603 according to timings of the video signal and the correction signal. A correction coefficient for each of corresponding pixel positions (correction points) is read.

A luminance information extraction unit 602 calculates an adjustment value for changing a ratio of the correction coefficient (magnitude of the correction amount) based on the display luminance information. Specifically, the luminance information extraction unit 602 calculates the adjustment value so that the correction amount is small if the display luminance is high and so that the correction amount is large if the display luminance is low. Display luminance information is an index representing a magnitude of a luminance to be displayed. In this embodiment, the luminance level of the input video signal is used as the display luminance information.

A luminance non-uniformity coefficient interpolation unit 604 interpolates the correction coefficients for the respective correction points, thereby calculating and outputting the correction coefficient of each pixel according to a display position.

A luminance non-uniformity computing unit 605 multiplies the input video signal by the luminance non-uniformity correction coefficient, thereby correcting the luminance non-uniformity. The luminance non-uniformity correction coefficient is obtained by multiplying the correction coefficient calculated by the luminance non-uniformity correction coefficient interpolation unit 604 by the adjustment value calculated by the luminance information extraction unit 602. Therefore, if the luminance level of the input signal is high (display luminance is high) the degree of the luminance non-uniformity correction is low. If the luminance level of the input signal is low (display luminance is low), the degree of the luminance non-uniformity correction is high.

A level detection unit 606 detects a level of the video signal. A color non-uniformity correction coefficient interpolation unit 608 reads a color non-uniformity correction coefficient for each correction point from a color non-uniformity correction coefficient storage unit 607 according to levels of the R, G, and B signals, interpolates the color non-uniformity correction coefficients, and calculates a color non-uniformity correction coefficient per pixel or pixel block. The calculated color non-uniformity correction coefficient is added to or subtracted from the luminance non-uniformity corrected input signal.

Figure 9:
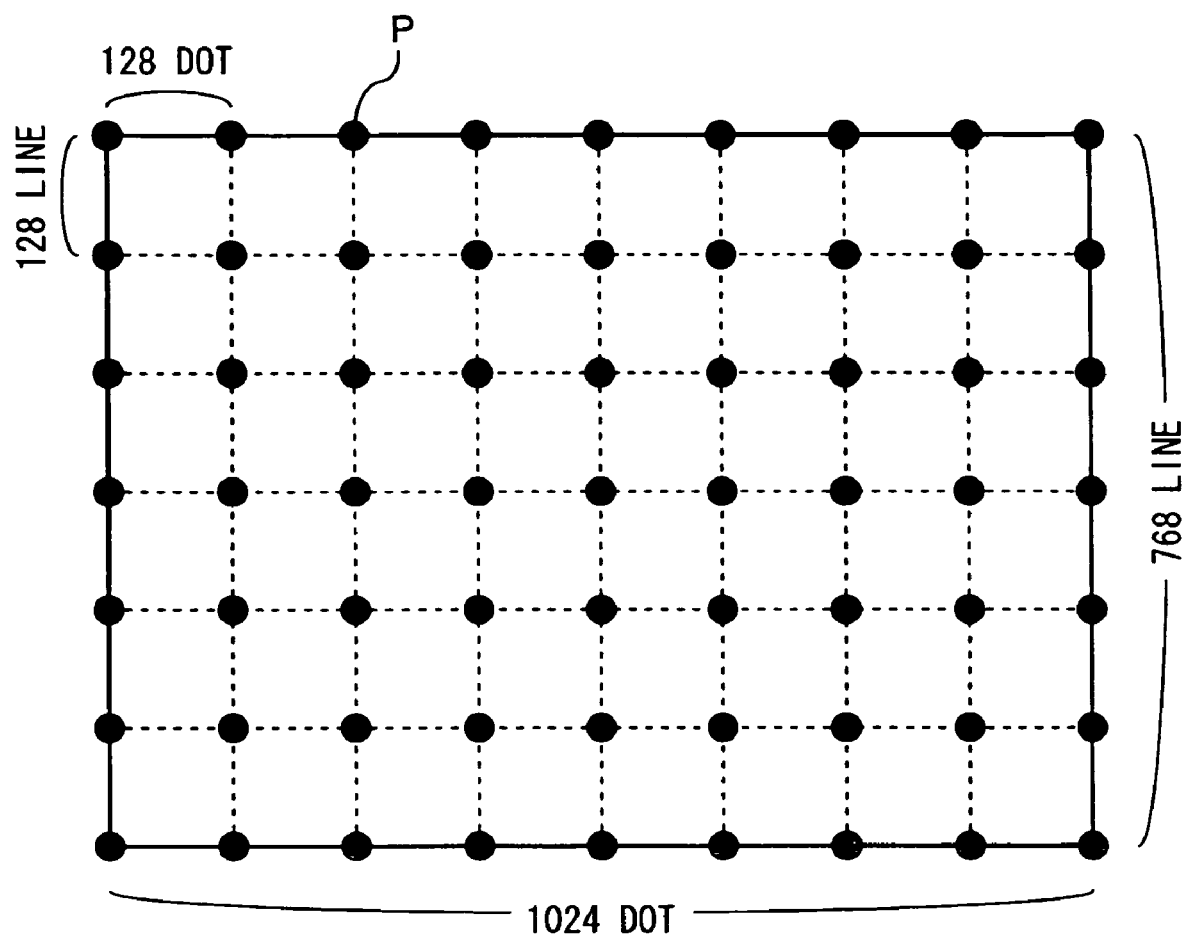
FIG. 9 depicts one example of correction points.

Referring to FIG. 9, an example of setting the correction coefficient (correction data) for each of the correction points which the screen is divided at predetermined intervals in both horizontal and vertical directions to the luminance non-uniformity correction coefficient storage unit 603 or the color non-uniformity correction coefficient storage unit 607 will be described. FIG. 9 depicts an instance in which a video signal under the XGA display standard of 1024 dots by 768 lines is divided into nine points at intervals of 128 dots horizontally and seven points at intervals of 128 lines vertically. In this case, on one screen, data of a total of 63 correction points P is set in the RAM. As stated, the correction coefficients for the respective pixels are calculated by allowing the coefficient interpolation units 604 and 608 to interpolate the correction coefficients for the stored correction points P in both horizontal and vertical directions. Thereby a memory amount is reduced as compared with storing the correction coefficients for all pixels.

It is also preferable that the luminance non-uniformity coefficient storage unit 603 and the color non-uniformity coefficient storage unit 607 store the correction coefficients for every input level.

To reduce the memory amount in an input level direction, the input level may be divided and the luminance non-uniformity coefficient storage unit 603 and the color non-uniformity coefficient storage unit 607 may store the correction coefficients corresponding to the respective divided input levels. In this case, the luminance information extraction unit 602 or the level detection unit 606 detects the level of the input video signal, and the luminance non-uniformity coefficient interpolation unit 604 or the color non-uniformity coefficient interpolation unit 608 interpolates the correction coefficients in the input level direction.

As can be seen, the coefficient interpolation unit 604 or 608 can interpolate the pixel positions in the horizontal and vertical directions and the level direction of the input signal.

As an interpolation method, various methods including nearest neighbor interpolation, linear interpolation, cubic interpolation, and spline interpolation can be used.

The luminance non-uniformity correction method will now be described in detail.

(Conventional Luminance Non-Uniformity Correction Method)

A maximum luminance of each pixel (x, y) is denoted by Kmax (x, y), a luminance of a pixel having the lowest luminance is denoted by Kmax (min), and the input video signal level is denoted by Din. If a signal level Dout after the correction is corrected to satisfy the following equation, a display luminance Kout can be made uniform on the entire display screen.

$$Dout=(Kmax(min)/Kmax(x, y))\times Din$$

It is also preferable that the luminance of an abnormal pixel such as a defective pixel is not selected as Kmax (min). While referring to, for example, a pixel luminance distribution, a lowest luminance from among those having a predetermined degree (predetermined number of pixels) may be set as Kmax (min).

If this processing is performed on each of the liquid crystal panels for R, G, and B, the image can be displayed without luminance non-uniformity.

However, the conventional method has the disadvantage in that the maximum luminance of the entire screen is greatly reduced from that before the correction because the maximum of the luminance Kout after the correction is equal to Kmax(min).

(Luminance Non-Uniformity Correction Method According to this Embodiment)

To solve the conventional disadvantage, therefore, the luminance non-uniformity and color non-uniformity correction unit 103 according to this embodiment changes a luminance non-uniformity correction ratio based on the input signal level.

For example, if the input signal level is higher than a predetermined level Dref, the signal level Dout after the correction is set as represented by the following equation and the luminance non-uniformity correction is not, therefore, performed.

$$Dout=Din$$

If the input signal level is the predetermined level Dref or lower, the signal level Dout after the correction is set as represented by the following equation and the luminance non-uniformity correction is, therefore, performed.

$$Dout=(Kmax(min)/Kmax(x, y))\times Din$$

In the equation, (max(min)/Kmax(x, y)) denotes the luminance non-uniformity correction coefficient.

As an alternative correction method, if the input signal level is high, the luminance non-uniformity correction ratio can be linearly changed.

With this alternative method, if the input signal level is the predetermined level Dref or lower, the signal level Dout after the correction is set as represented by the following equation similarly to the former method and the luminance non-uniformity correction is performed.

$$Dout=(Kmax(min)/Kmax(x, y))\times Din$$

If the input signal level is higher than the predetermined level Dref, the signal level Dout after the correction is set as represented by the following equation.

$$Dout=((Kmax(min)+(Kmax(x, y)-Kmax(min))\times \\ ((Din-Dref)/(Dmax-Dref))/Kmax(x, y))\times Din$$

In the equation, Dmax denotes a maximum input signal level.

Thus, the correction coefficient can be changed according to the input signal level as shown in FIGS. 5, 6 and 7.

According to this method, the luminance non-uniformity correction ratio is linearly changed according to the input signal level. Alternatively, it is also preferable to adopt a method for changing the luminance non-uniformity correction ratio nonlinearly. For example, if the correction coefficient storage unit 603 stores desired coefficients corresponding to the respective input signal levels, the luminance non-uniformity correction ratio can be arbitrarily changed.

(Color Non-Uniformity Correction Method According to this Embodiment)

A color non-uniformity correction method according to this embodiment will be described. In to the color non-uniformity correction method according to this embodiment, the color non-uniformity on the screen is corrected by changing fewer luminances without making the luminance of the entire screen uniform. In this method, a color difference among pixels (or pixel blocks) is preferentially suppressed over the luminance non-uniformity among pixels (or pixel blocks).

According to the conventional method, the luminance of the entire screen is made uniform for every panel for R, G or B, and the color non-uniformity is subsequently eliminated. The conventional method has the disadvantage in that the display luminance is reduced as stated above.

In the color non-uniformity correction method according to this embodiment, by contrast, as shown in FIGS. 5, 6 and 7, a luminance balance among the R, G, and B signals is adjusted per pixel or per pixel block (adjacent pixel group) consisting of a plurality of (e.g., ten) adjacent pixels. With this method, although the display luminance (brightness) is not uniform among the pixels (or pixel blocks), a difference in chromaticity (a hue and a color saturation) is small among the pixels (or pixel blocks). It is thereby possible to improve the color non-uniformity of the displayed image without causing a reduction in the display luminance.

According to this embodiment, since the color non-uniformity is corrected after the luminance non-uniformity correction, the color non-uniformity correction takes preference over the luminance non-uniformity correction. There is a probability that the luminance non-uniformity occurs (is increased) due to the color non-uniformity correction. However, as will be described later, the vision of human is more sensitive to the color non-uniformity than the luminance non-uniformity. Due to this, the possibility of occurring luminance non-uniformity is negligible. To appropriately leave the effect of the luminance non-uniformity correction, the correction amount (coefficient) of the color non-uniformity correction is preferably limited to fall within a predetermined range.

In the color non-uniformity correction, it is preferable to adjust the luminance balance among the R, G, and B signals by not only reducing the signal level (reducing the coefficient for) of one of the R, G, and B signals but also increasing the signal levels (increasing the coefficient for) of one of the R, G, and B signals. For example, if the luminance balance among R, G, and B is adjusted from 3:1:1 to 1:1:1, not the signal level of only the R signal is reduced but the signal level of the R signal is reduced and also the signal levels of the G and B signals are increased (so as to have the balance of, for example, 2:2:2). Thereby, the color non-uniformity correction can be realized with maintaining high luminance.

The luminance non-uniformity and color non-uniformity correction method according to this embodiment makes use of the following properties of the human vision.

(1) The human vision is more sensitive to the color non-uniformity than the luminance non-uniformity. Due to this, the color non-uniformity correction (the correction method for independently correcting the luminance levels of R, G, and B and suppressing the color non-uniformity so as to adjust the color balance per pixel or pixel block) takes preference over the luminance non-uniformity correction.

(2) The human vision is more sensitive to the luminance difference at low luminance than at high luminance. Due to this, if the luminance level of the input video signal is high, the luminance non-uniformity correction amount is set small as compared with the low luminance level.

In this embodiment, the method for changing the luminance non-uniformity correction ratio according to the input signal level while using the input video signal level as the display luminance information has been described. However, as the display luminance information, a value obtained by statistically processing the video signal such as an average luminance, a maximum luminance or a minimum luminance of the entire screen, a brightness adjustment value set by operating the brightness adjustment SW, or an indicated value by various indication means for changing the brightness of the display screen may be used.

In this embodiment, the luminance non-uniformity correction and the color non-uniformity correction are sequentially executed in different circuits. However, it is also preferable that both the luminance non-uniformity correction and the color non-uniformity correction are executed by one correction processing performed by one correction circuit. In this case, the correction amounts (correction coefficients) of the luminance non-uniformity correction and the color non-uniformity correction are preferably appropriately adjusted so as to change the correction effect according to the display luminance information.

This application claims priority from Japanese Patent Application No. 2004-266725 filed Sep. 14, 2004 and Japanese Patent Application No. 2005-202694 filed Jul. 12, 2005, which are hereby incorporated by reference herein.

What is claimed is:

1. A display apparatus comprising:
a plurality of optical modulators that display monochromatic images, respectively;
an optical system that synthesizes the monochromatic images into a color image;
a luminance non-uniformity correction unit that adjusts a correction coefficient according to a luminance to be displayed, and that corrects a luminance non-uniformity in the monochromatic image using the adjusted correction coefficient; and
a color non-uniformity correction unit that adjusts a luminance balance among the monochromatic images per pixel or pixel block, thereby correcting a color non-uniformity in the color image,
wherein the luminance non-uniformity correction unit adjusts the correction coefficient so as to reduce a correction amount of the luminance non-uniformity if a level of the luminance to be displayed is equal to or higher than a predetermined level, and does not adjust the correction coefficient if the level of the luminance to be displayed is lower than the predetermined level.

2. A display apparatus according to claim 1, wherein the luminance non-uniformity correction unit adjusts the correction coefficient so as not to suppress the luminance non-uniformity if the luminance to be displayed is higher and so as to suppress the luminance non-uniformity if the luminance to be displayed is lower.

3. A display apparatus according to claim 1, wherein the luminance to be displayed is a luminance level of an input video signal.

4. A display apparatus according to claim 1, wherein the the luminance to be displayed is an average, a maximum, or a minimum of a luminance level of an input video signal.

5. A display apparatus according to claim 1, wherein the color non-uniformity correction unit performs a color non-uniformity correction on a video signal corrected by the luminance non-uniformity correction unit.

6. A display apparatus according to claim 5, wherein the color non-uniformity correction unit restricts a correction amount of the color non-uniformity correction to fall within a predetermined range.

7. A display apparatus comprising:
a plurality of optical modulators that display monochromatic images, respectively;
an optical system that synthesizes the monochromatic images into a color image;
a luminance non-uniformity correction unit that adjusts a correction coefficient according to a luminance to be displayed, and that corrects a luminance non-uniformity in the monochromatic image using the adjusted correction coefficient; and
a color non-uniformity correction unit that adjusts a luminance balance among the monochromatic images per pixel or pixel block, thereby correcting a color non-uniformity in the color image, wherein the color non-uniformity correction unit performs a color non-uniformity correction on a video signal corrected by the luminance non-uniformity correction unit, and wherein the color non-uniformity correction unit restricts a correction amount of the color non-uniformity correction to fall within a predetermined range.

\* \* \* \* \*